United States Patent
Kawai et al.

(10) Patent No.: US 7,156,521 B2
(45) Date of Patent: Jan. 2, 2007

(54) PROJECTOR FOR COMPENSATING CHROMATIC ABERRATION OF MAGNIFICATION

(75) Inventors: Fumie Kawai, Gifu (JP); Kazuhiro Nishida, Matsumoto (JP); Shuji Narimatsu, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 220 days.

(21) Appl. No.: 10/500,571

(22) PCT Filed: Oct. 29, 2003

(86) PCT No.: PCT/JP03/13826

§ 371 (c)(1),
(2), (4) Date: Sep. 15, 2004

(87) PCT Pub. No.: WO2004/040366

PCT Pub. Date: May 13, 2004

(65) Prior Publication Data
US 2005/0174542 A1 Aug. 11, 2005

(30) Foreign Application Priority Data
Oct. 31, 2002 (JP) .............................. 2002-317511

(51) Int. Cl.
G03B 21/14 (2006.01)
G03B 21/00 (2006.01)
G03B 21/20 (2006.01)

(52) U.S. Cl. ........................... 353/20; 353/31; 353/102
(58) Field of Classification Search .................. 353/20, 353/31, 34, 37, 102; 359/483
See application file for complete search history.

(56) References Cited

U.S. PATENT DOCUMENTS

| 6,229,646 | B1* | 5/2001 | Mitsutake et al. .......... 359/487 |
| 6,592,224 | B1* | 7/2003 | Ito et al. ....................... 353/20 |
| 6,811,262 | B1* | 11/2004 | Takezawa et al. ............. 353/20 |
| 6,942,347 | B1* | 9/2005 | Sugawara et al. ............. 353/33 |
| 2002/0036815 | A1 | 3/2002 | Fujimori ..................... 359/245 |
| 2002/0060780 | A1 | 5/2002 | Takezawa et al. ............. 353/53 |
| 2002/0131144 | A1 | 9/2002 | Fujimori ..................... 359/246 |
| 2005/0213057 | A1* | 9/2005 | Nakayama ................... 353/102 |
| 2006/0072209 | A1* | 4/2006 | Karasawa et al. .......... 359/651 |

FOREIGN PATENT DOCUMENTS

JP   A 3-78718   4/1991

(Continued)

*Primary Examiner*—Melissa J Koval
(74) *Attorney, Agent, or Firm*—Oliff & Berridge, PLC (57) ABSTRACT

A projector having a cross-dichroic prism (260) synthesizing three kinds of red, green, and blue light emitted from liquid crystal panels (250, 252, 254); and a projection lens (270) projecting the synthesized light and also having polarizing plates (251, 253, 255) disposed on the optical paths between the corresponding liquid crystal panels (250, 252, 254) and the cross-dichroic prism (260) includes a lens element (256), serving as an optical element for compensating chromatic aberration of magnification, which is formed on and integrally with one surface of the polarizing plate (251) disposed on the light path of the red light and which adjusts the size of the projected image screen of the red light extending along at least a predetermined direction so as to be nearly equal to those of the projected image screens of the other kinds of color light extending along the predetermined direction.

25 Claims, 7 Drawing Sheets

SYNTHETIC COLOR LIGHT

FOREIGN PATENT DOCUMENTS

| | | |
|---|---|---|
| JP | A 11-38210 | 2/1999 |
| JP | A 2000-89364 | 3/2000 |
| JP | A 2000-155372 | 6/2000 |
| JP | A 2000-206450 | 7/2000 |
| JP | A 2002-6298 | 1/2002 |
| JP | A 2002-202489 | 7/2002 |
| JP | A 2002-214704 | 7/2002 |
| JP | A 2003-233124 | 8/2003 |

* cited by examiner

SYNTHETIC COLOR LIGHT

SYNTHETIC COLOR LIGHT

SYNTHETIC COLOR LIGHT

PROJECTOR FOR COMPENSATING CHROMATIC ABERRATION OF MAGNIFICATION

TECHNICAL FIELD

The present invention relates to a projector, and more particularly, it relates to compensation of chromatic aberration of magnification-of a projected image screen.

BACKGROUND ART

A projector projecting and displaying a color image includes an illumination optical system, a color-light-separating optical system, liquid-crystal panels for corresponding kinds of separated color light, a color-light-synthesizing optical system, and a projection optical system. Light emitted from the illumination optical system is separated into three kinds of red, green, and blue light by the color-light-separating optical system, and the three kinds of color light are modulated by corresponding liquid crystal panels so as to generate corresponding images. Then, these images are synthesized by the color-light-synthesizing optical system and are projected by the projection optical system. The projection optical system focuses the three kinds of synthesized color light on a projection screen so as to project a color image onto the projection screen. Unfortunately, the projection optical system generally has chromatic aberration of magnification, thereby often causing a problem in that the sizes of projected image screens of the three kinds of color light are different from one another. In order to solve the above problem, a lens for compensating chromatic aberration of magnification can be included in a lens set forming the projection optical system; however this structure makes the projection optical system larger. As a countermeasure against this problem, a technique for compensating the above-mentioned chromatic aberration of magnification by providing a lens element or a prism element in a space from the emitting surface of each electrooptical device to the incident surface of the color-light-synthesizing optical system, more particularly, by providing a lens element or a prism element on the incident surface of a color-light-synthesizing prism without making the projection optical system larger has been known (for example, see Patent Document 1). Also, the color-light-synthesizing prism serving as the color-light-synthesizing optical system is sometimes formed so as to have a convex or concave dichroic surface (for example, see Patent Document 2).

Patent Document 1: Japanese Unexamined Patent Application Publication No. 2000-206450 (Claim 1, FIG. 1)

Patent Document 2: Japanese Unexamined Patent Application Publication No. 11-38210.

Unfortunately, since the space from the emitting surface of each electrooptical device to the incident surface of the color-light-synthesizing prism is narrow, disposition of an additional lens element or prism element in the space makes the space narrower, thereby deteriorating the cooling feature of the electrooptical device. Also, it is often difficult to fabricate a lens element or a prism element in order to dispose it on the incident surface of the color-light-synthesizing prism, when the shape and the function of the color-light-synthesizing prism are taken into consideration.

DISCLOSURE OF INVENTION

The present invention has been made in view of the above problems. Accordingly, it is an object of the present invention to provide a projector having a new structure, taking both cooling feature and workability of each electrooptical device into reconsideration on the occasion of compensating chromatic aberration of magnification of a projection optical system by disposing an optical element for compensating chromatic aberration of magnification in the space from the emitting surface of the electrooptical device to the incident surface of a color-light-synthesizing optical system.

A projector according to the present invention includes an illumination optical system emitting illumination light; a color-light-separating optical system separating the illumination light into three kinds of red, green, and blue light; electrooptical devices receiving the three kinds of color light separated by the color-light-separating optical system, converting them into corresponding kinds of light for forming images of the corresponding kinds of color light in accordance with image signals of the corresponding kinds of color light, and emitting them; a color-light-synthesizing optical system synthesizing the three kinds of color light emitted from the electrooptical devices; a projection optical system projecting the light synthesized by the color-light-synthesizing optical system; and polarizing plates disposed on the light paths of the corresponding kinds of color light between the corresponding electrooptical devices and the color-light-synthesizing optical system and further includes an optical element which adjusts the size of a projected image screen of at least one of the three kinds of color light extending along at least a predetermined direction so as to be nearly equal to those of the other kinds of color light extending along the predetermined direction and which is formed on and integrally with one surface of the corresponding polarizing plate so as to serve as an optical element for compensating chromatic aberration of magnification.

With this structure, since the polarizing plate and the corresponding optical element for compensating chromatic aberration of magnification are integrated into one substrate, the space for these components can be effectively utilized, thereby minimizing deterioration of the cooling feature of the electrooptical device. Also, the structure has an advantage in that it is easier to integrate the optical element for compensating chromatic aberration of magnification, such as a lens element or a prism element, with the corresponding polarizing plate than to integrate the optical elements for compensating chromatic aberration of magnification with a color-light-synthesizing prism.

Also, in the above case, the projector may have a structure in which the parent material of the polarizing plate disposed on the light path of the red light is composed of glass or a light-transmissive resin, the parent material of the polarizing plates disposed on the light paths of the green and blue light are composed of sapphire or quart crystal, and the optical element for compensating chromatic aberration of magnification is disposed only on the light path of the red light. Since the polarizing plate disposed on the light path of the red light has a wider temperature allowance than those disposed on the light paths of the other kinds of color light, in place of thermally conductive quartz crystal or sapphire, glass or resin having better workability than the quartz crystal or sapphire can be used as the parent material of the polarizing plate used for the red light. Accordingly, a lens element or a prism element can be easily formed on an integrally with the polarizing plate used for the red light by making use of its parent material.

A projector according to the present invention includes an illumination optical system emitting illumination light; a color-light-separating optical system separating the illumination light into three kinds of red, green, and blue light;

electrooptical devices receiving the three kinds of color light separated by the color-light-separating optical system, converting them into corresponding kinds of light for forming images of the corresponding kinds of color light in accordance with image signals of the corresponding kinds of color light, and emitting them; a color-light-synthesizing optical system synthesizing the three kinds of color light emitted from the electrooptical devices; a projection optical system projecting the light synthesized by the color-light-synthesizing optical system; and angle-of-view compensating films disposed on the light paths of the corresponding kinds of color light between the corresponding electrooptical devices and the color-light-synthesizing optical system and further includes an optical element which adjusts the size of a projected image screen of at least one of the three kinds of color light, extending along at least a predetermined direction, so as to be nearly equal to those of the other kinds of color light extending along the predetermined direction and which is formed on and integrally with one surface of the corresponding angle-of-view compensating film so as to serve as an optical element for compensating chromatic aberration of magnification.

With this structure, since the angle-of-field compensating film and the corresponding optical element for compensating chromatic aberration of magnification are integrated into one substrate, the space for these components can be effectively utilized, thereby minimizing deterioration of the cooling feature of electrooptical device. Also, it is easier to integrate the optical element for compensating chromatic aberration of magnification, such as a lens element or a prism element, with the corresponding angle-of-field compensating film than to integrate the optical elements with a color-light-synthesizing prism.

In addition, each of the above-described projectors is characterized in that, when the optical axis of the projection optical system is shifted (moved) in parallel to at least one of two directions mutually perpendicular to the system optical axis, the optical axis of the optical element for compensating chromatic aberration of magnification is shifted in parallel to a predetermined direction, following the shift of the optical axis of the projection optical system. With this structure, even when the projection optical system is shifted, compensation of chromatic aberration of magnification of a projected image screen can be properly performed. The system optical axis stated here is a hypothetical axis formed by a series of optical elements disposed on the light path upstream of the projection optical system and substantially coincides with the center axis of light fluxes incident on the projection optical system.

Meanwhile, in the above-mentioned case, the optical element preferably has no refraction feature on a plane extending orthogonal to the predetermined direction and including the generating line thereof and has a refraction feature on a plane extending orthogonal to the generating line thereof. With this structure, of differences in sizes of the projected image screens of the corresponding kinds of color light, caused by the chromatic aberration of magnification of the projection optical system, differences in sizes of the projected image screens extending along a direction perpendicular to the generating line can be reduced.

BEST MODE FOR CARRYING OUT THE INVENTION

Figure 1:
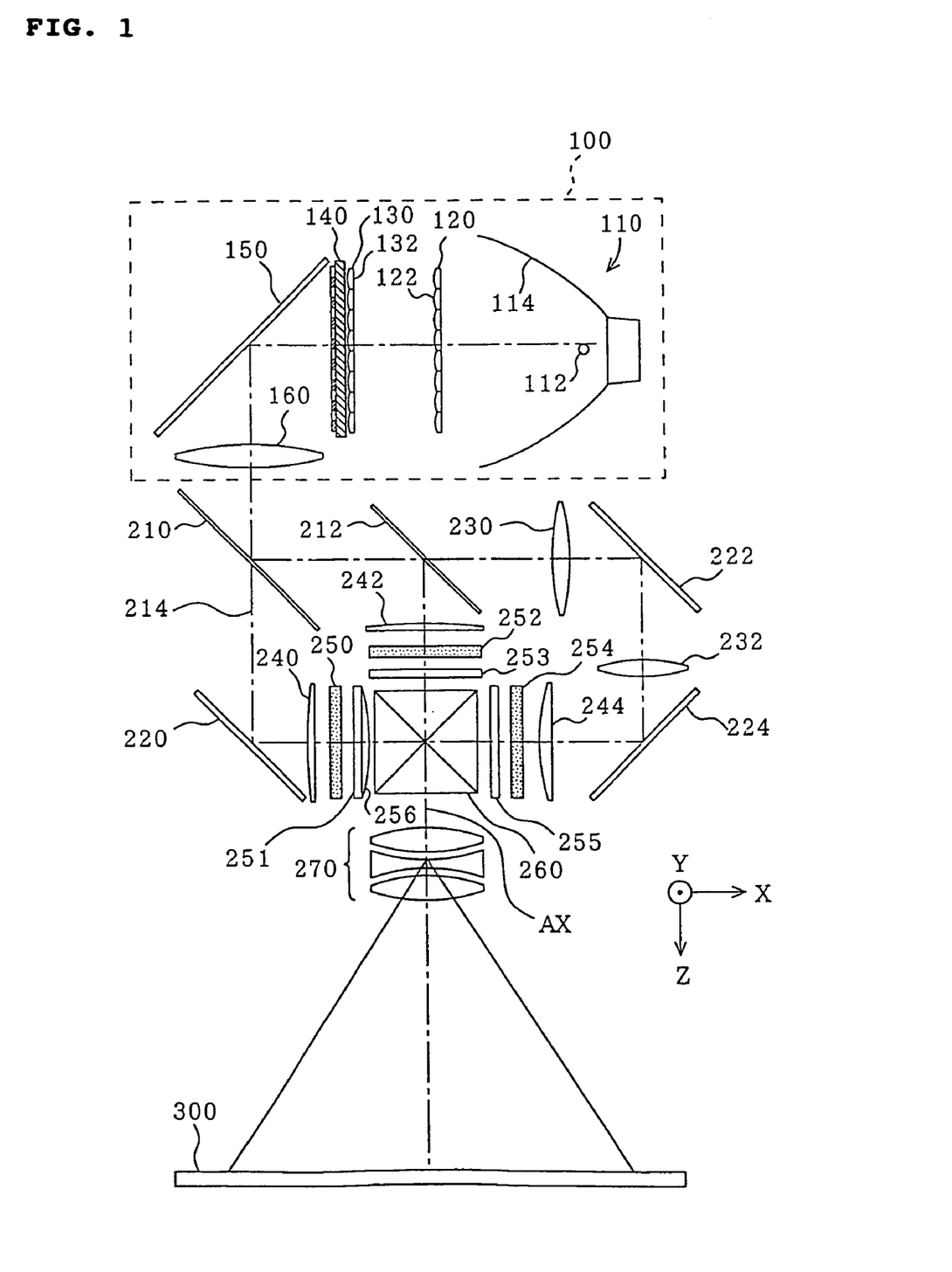
FIG. 1 illustrates the structure of an overall optical system of a projector according to an embodiment of the present invention.

FIG. 1 is a plan view of the schematic structure of an overall optical system of a projector according to an embodiment of the present invention. The projector includes an illumination optical system 100; dichroic mirrors 210 and 212; reflecting mirrors 220, 222 and 224; an incident-side lens 230; a relay lens 232; three field lenses 240, 242 and 244; three liquid crystal panels 250, 252 and 254 serving as electrooptical devices; polarizing plates 251, 253 and 255 corresponding to the foregoing liquid crystal panels; a cross-dichroic prism (color-light-synthesizing prism) 260 serving as a color-light-synthesizing optical system; and a projection lens 270 serving as a projection optical system.

The illumination optical system 100 includes a light source 110 emitting light fluxes in a predetermined direction; a first lens array 120; a second lens array 130; a polarization-conversing element 140; a reflecting mirror 150; and a superimposing lens 160. The first and second lens arrays 120 and 130 form an integrator optical system for substantially uniformly illuminating the three liquid crystal panels 250, 252 and 254 occupying the illumination region thereof.

The light source 110 has a light source lamp 112 serving as a radial light source emitting radial rays; and a concave mirror 114 emitting the radial light emitted from the light source lamp 112 so as to be substantially parallel light fluxes. As the light source lamp 112, a high-pressure discharge lamp such as a metal halide lamp or a high-pressure mercury lamp is generally used. Although a paraboloid mirror is preferably used as the concave mirror 114, an ellipsoidal mirror or a spherical mirror may be used in place of the paraboloid mirror.

The first lens array 120 is formed by a plurality of first small lenses 122. The second lens array 130 is formed by a plurality of second small lenses 132 corresponding to the plurality of respective first small lenses 122. Substantially parallel light fluxes emitted from the light source 110 are divided into a plurality of partial light fluxes by the first and second lens arrays 120 and 130 and are incident on the polarization-conversing element 140. The polarization-conversing element 140 has a function of converting non-polarized light into predetermined linearly polarized light, for example, s-polarized light or p-polarized light and emitting it. Accordingly, the plurality of partial light fluxes incident on the polarization-conversing element 140 is converted into respectively predetermined linearly polarized light and is emitted. The plurality of partial light fluxes emitted from the polarization-conversing element 140 is reflected at the reflecting mirror 150 and is incident on the superimposing lens 160. Most of the plurality of partial light fluxes incident on the superimposing lens 160 is superimposed on the liquid crystal panels 250, 252 and 254 occupying the illumination region by a superimposing action of the superimposing lens 160. As a result, each of the liquid crystal panels 250, 252 and 254 is almost uniformly illuminated.

The two dichroic mirrors 210 and 212 form a color-light-separating optical system 214 separating light emitted from the illumination optical system 100 into three kinds of red (R), green (G) and blue (B) light. The first dichroic mirror 210 allows a red light component of light emitted from the illumination optical system 100 to be transmitted therethrough and reflects blue and green light components thereat.

The red light transmitted through the first dichroic mirror 210 is reflected at the reflecting mirror 220, passes through the field lens 240, and reaches the liquid crystal panel 250 for the red light. The field lens 240 has a function of collecting each of the partial light fluxes transmitted therethrough so as to be parallel to the main optical axis (center axis) thereof. The field lenses 242 and 244 disposed in front of the corresponding liquid crystal panels act likewise.

Of the blue and green light reflected at the first dichroic mirror 210, the green light is reflected at the second dichroic mirror 212, passes through the field lens 242, and reaches the liquid crystal panel 252 for the green light, while the blue light is transmitted through the second dichroic mirror 212 and then through a relay lens system including the incident-side lens 230, the relay lens 232, and the reflecting mirrors 222 and 224. The blue light transmitted through the relay lens system is further transmitted through the field lens 244 and reaches the liquid crystal panel 254 for the blue light.

Meanwhile, the relay lens system is used for the blue light in order to prevent reduction in utilization efficiency of the blue light which is caused by the fact that the light path of the blue light is longer than those of the other kinds of color light, in other words, in order to transmit the blue light incident on the incident-side lens 230 to the emitting-side lens (field lens) 244 without change.

Each of the three liquid crystal panels 250, 252 and 254 serving as electrooptical devices has a function as a light-converting device which converts the corresponding color light incident thereon into light for forming an image in accordance with a given image signal and emits the converted light. Each of the liquid crystal panels 250, 252 and 254 generally has polarizing plates disposed on the incident and emitting surface sides of light so as to adjust the polarizing direction of the corresponding color light. Meanwhile, the polarizing plates disposed on the emitting surface sides of the liquid crystal panels 250, 252 and 254 are shown in FIG. 1 by reference numbers 251, 253 and 255, respectively.

The cross-dichroic prism 260 functions as a color-light-synthesizing optical system synthesizing the three kinds of color light emitted from the three liquid crystal panels 250, 252 and 254. The cross-dichroic prism 260 has a dielectric multilayer film reflecting red light thereat and another dielectric multilayer film reflecting blue light thereat, wherein the two films are formed along the interfaces of four rectangular prisms in an approximate X-shape. The three kinds of color light are synthesized by these dielectric multilayer films so as to form synthetic light for projecting a color image. The synthetic light generated by the cross-dichroic prism 260 is emitted toward the projection lens 270. The projection lens 270 projects the synthetic light onto a projection screen 300 so as to display a color image on the same.

Meanwhile, as shown in FIG. 1, the direction of the system optical axis Ax is defined as the Z axis (the traveling direction of light is a positive Z direction), a direction parallel to a line of intersection between the dielectric multilayer film-reflecting the red light thereat and the dielectric multilayer film reflecting the blue light thereat is defined as the Y axis (a direction upward the plane of the figure is a positive Y direction), and a direction perpendicular to the Z and Y axes is defined as the X axis (a leftward direction when facing toward the positive Z direction is a positive X direction).

Figure 3A:
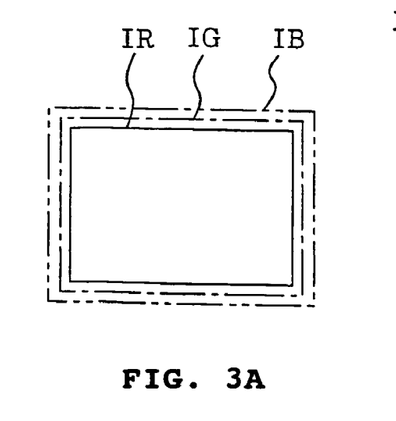
FIG. 3 illustrates states of projected image screens of the projector including the optical system shown in FIG. 2.

In the meantime, since the projection lens 270 generally has chromatic aberration of magnification, the magnification of a projected image screen varies in accordance with the color, that is the wavelength, of light incident on the projection lens 270. Accordingly, as shown in FIG. 3(a), the sizes of image screens IR, IG, and IB formed from the corresponding kinds of R, G, and B color light and projected onto a screen by a projector having no function of compensating its chromatic aberration of magnification are sometimes different from one another. Meanwhile, FIG. 3(a) illustrates a case where the image screens become larger in the order from light having a longer wavelength to light having a shorter wave length, that is, a case satisfying the condition: the image screen IR of the red light<the image screen IG of the green light<the image screen IB of the blue light.

Figure 2:
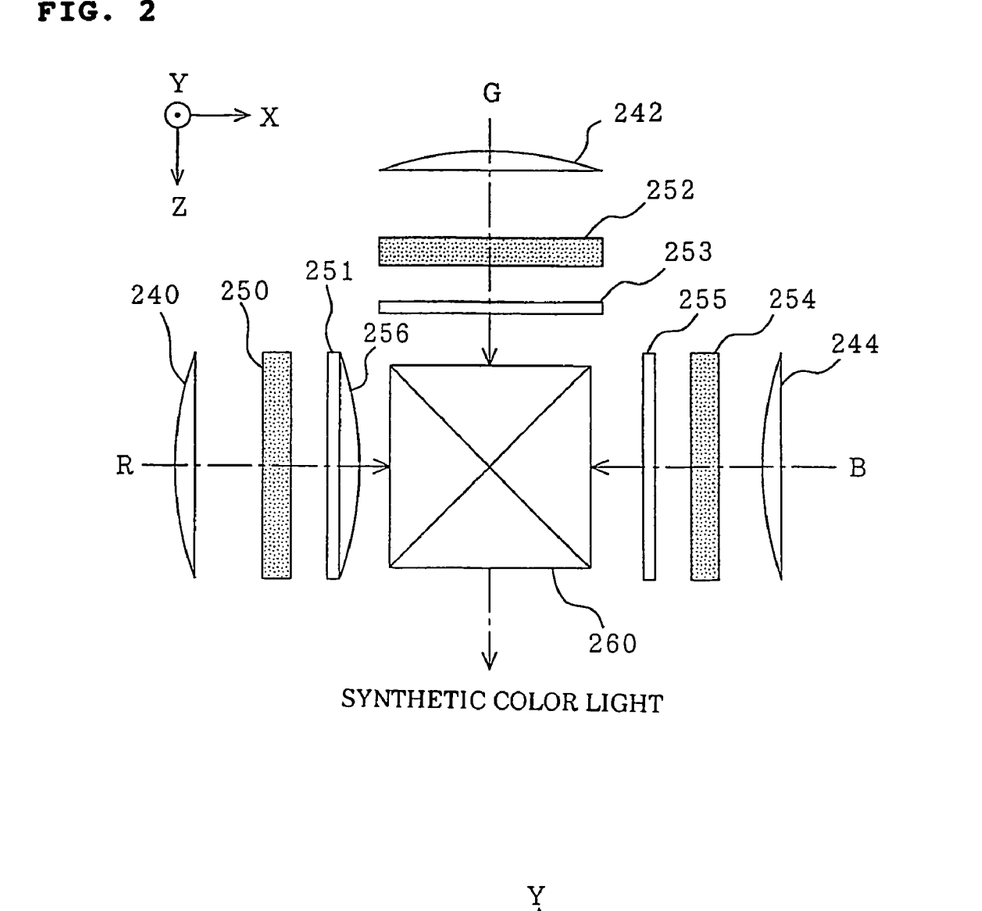
FIG. 2 is a plan view illustrating a partial structure of the optical system shown in FIG. 1, in the vicinity of a cross-dichroic prism of the same.
Figure 3B:
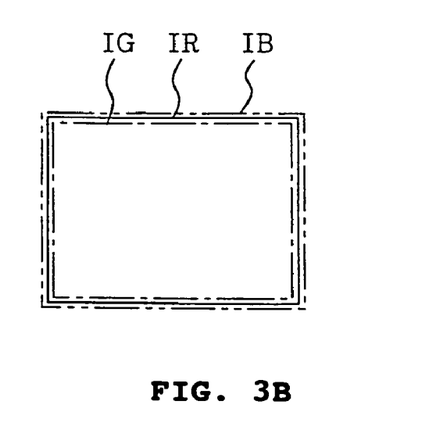

As a countermeasure against the above problem, the projector according to the present invention has an optical element for compensating chromatic aberration of magnification incorporated on the light path of the red light. In this structure, the optical element for compensating chromatic aberration of magnification is a convex lens 256 for compensating chromatic aberration of magnification, formed on and integrally with the emitting surface of the polarizing plate 251 disposed on the light path of the red light. For better understanding of the convex lens 256 for compensating chromatic aberration of magnification, FIG. 2 illustrates a partial structure of the optical system shown in FIG. 1, in the vicinity of the cross-dichroic prism 260. The convex lens 256 for compensating chromatic aberration of magnification has a function of magnifying the size of the image screen of the red light projected onto a screen and locating the projected image screen of the red light between the projected image screens of the green and blue light. As a result, in the above-mentioned projector, as shown in FIG. 3(b), differences in sizes of the projected image screens IR, IG, and IB of the corresponding colors, caused by the chromatic aberration of magnification of the projection lens 270 become smaller, and these sizes become nearly equal to one another.

Figure 5A:
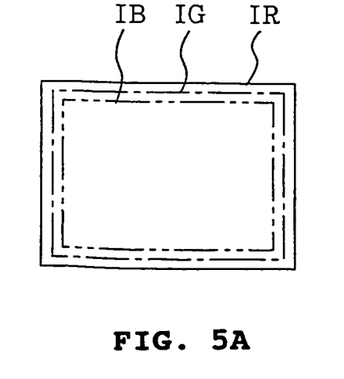
FIG. 5 illustrates states of projected image screens of the projector including the optical system shown in FIG. 4.

Also, as shown in FIG. 5(a), there is sometimes a case where the sizes of the image screens IR, IG, and IB formed from the corresponding kinds of R, G, and B color light and projected onto a screen by a projector having no function of compensating the chromatic aberration of magnification are become larger in the order from light having a shorter wavelength to light having a longer wavelength, that is, a case satisfying the condition: the image screen IR of the red light>the image screen IG of the green light>the image screen IB of the blue light.

Figure 4:
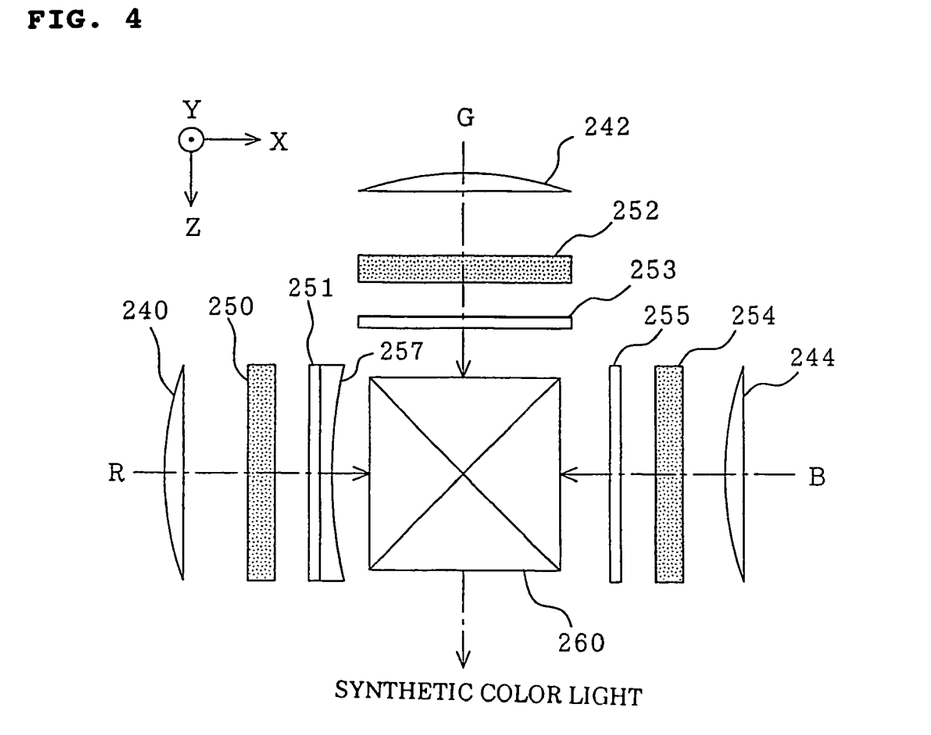
FIG. 4 is a plan view illustrating another partial structure of the optical system shown in FIG. 1, in the vicinity of the cross-dichroic prism of the same.
Figure 5B:
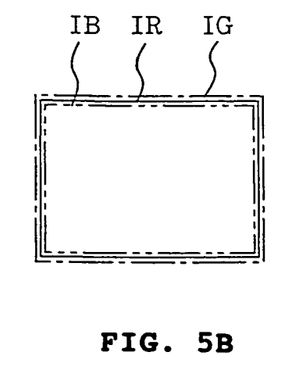

As a countermeasure against such a case, the case can be dealt with by employing an optical system as shown in FIG. 4. In this optical system, a concave lens 257 for compensating chromatic aberration of magnification is formed on and integrally with the emitting surface of the polarizing plate 251 disposed on the light path of the red light. The concave lens 257 for compensating chromatic aberration of magnification has a function of reducing the size of the projected image screen of the red light and locating the projected image screen of the red light between the projected image screens of the green and blue light. As a result, in the above-mentioned projector, as shown in FIG. 5(b), differences in sizes of the projected image screens IR, IG, and IB of the corresponding colors, caused by the chromatic aberration of magnification of the projection lens 270 become smaller, and these sizes become nearly equal to one another.

In the meantime, since each polarizing plate interposed between the corresponding liquid crystal panel and the cross-dichroic prism absorbs light and generates heat when the light is transmitted therethrough, a substrate having the polarizing plate fixed thereto is preferably composed of thermally conductive sapphire or quartz crystal. However, since the red light causes the polarizing plate to generate a less amount of heat than the green or blue light, the parent material or the base material of the polarizing plate 251 disposed on the light path of the red light may be composed of glass such as borosilicate glass or quartz glass or a light-transmissive resin. Since a glass substrate or a resin substrate can be more easily processed so as to have a curved surface than a sapphire substrate or the like, a lens element can be easily formed on and integrally with the emitting surface of the polarizing plate 251 composed of one of these parent materials by, for example, polishing the emitting surface.

Meanwhile, in the case of the structure shown in FIG. 2 or 4, the size of the image screen IR of the red light is not always needed to fall in a size range between the sizes of the image screens IG and IB of the other kinds of color light. For example, the size of the image screen IR of the red light may be arranged so as to be nearly equal to that of the image screen IG of the green light or the image screen IB of the blue-green light. Even with this arrangement, a variance in the sizes of the image screens of the three kinds of color light can be decreased as a whole. As is seen from the above description, the phrase "the sizes of the image screens are nearly equal to one another" in the present invention and this Description means not only that the sizes of the three image screens are equal to one another but also that differences in sizes of the image screens become smaller in comparison to the case where no countermeasure for compensating the chromatic aberration of magnification is employed at all.

Figure 6:
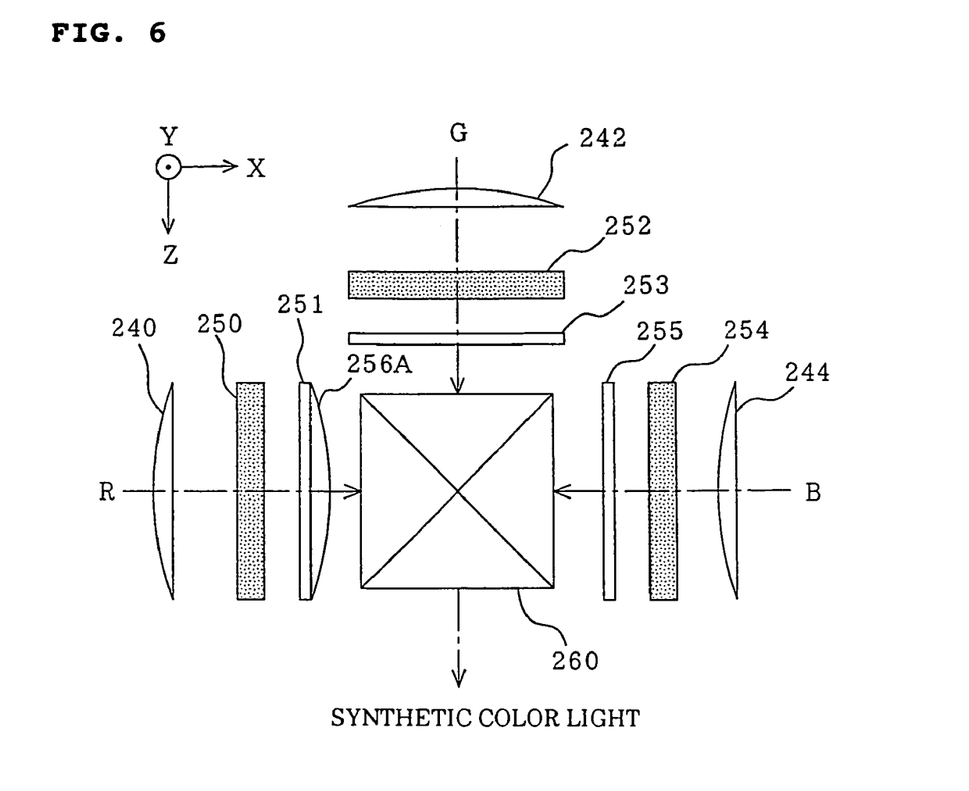
FIG. 6 is a plan view illustrating another partial structure of the optical system shown in FIG. 1, in the vicinity of a cross-dichroic prism of the same.
Figure 7A:
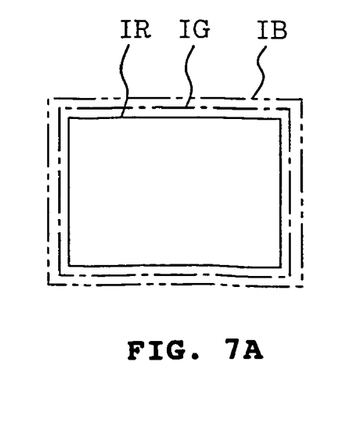
FIG. 7 illustrates states of projected image screens of the projector including the optical system shown in FIG. 6.
Figure 7B:
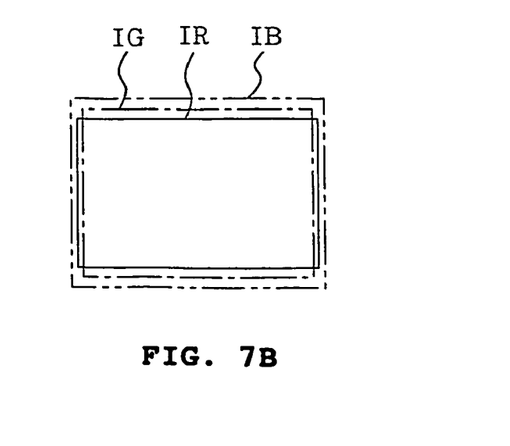

FIG. 6 is a plan view illustrating another partial structure of the optical system shown in FIG. 1, in the vicinity of the cross-dichroic prism 260. In this structure, the emitting-surface side of the polarizing plate 251 disposed on the light path of the red light has a cylindrical convex surface (serves as a cylindrical convex lens element) 256A having a generating line parallel to the Y axis. Also, in this case, as shown in FIG. 7, the sizes of the image screens IR, IG, and IB of the corresponding kinds of color light in the lateral direction of the image screens can be arranged so as to be nearly equal to one another (a change from (a) to (b) shown in FIG. 7). That is, of differences in sizes of the projected image screens of the corresponding kinds of color light, caused by the chromatic aberration of magnification of the projection lens 270, differences in sizes of the projected image screens extending along a direction perpendicular to the generating line (the X axis direction) can be reduced. Meanwhile, FIGS. 6 and 7 illustrate an example of adjusting the sizes of the image screens in the case of satisfying the condition: the image screen IR of the red light<the image screen IG of the green light<the image screen IB of the blue light. However, when the sizes of the image screens satisfy the condition: the image screen IR of the red light>the image screen IG of the green light>the image screen IB of the blue light, the sizes of the image screens IR, IG, and IB of the corresponding kinds of color light in the lateral direction of the image screens can be made nearly equal to one another, by forming the emitting-surface side of the polarizing plate 251 disposed on the light path of the red light so as to have a cylindrical concave surface (so as to serve as a cylindrical concave lens element) having a generating line parallel to the Y axis.

Also, when only the sizes of the image screens in the Y axis direction are adjusted, it is required only that a polarizing plate provided with an emitting surface having a lens element which serves as an optical element for compensating chromatic aberration of magnification and which has a cylindrical curved surface whose generating line is set so as to be parallel to the X axis direction be used.

Although FIG. 6 illustrates an example case where the emitting surface is a circularly cylindrical curved surface, the emitting surface is not limited to such a shape, and it may be an elliptically cylindrical curved surface. That is, it is required only to have a curved surface having no refraction feature on a plane including the generating line thereof and having a refraction feature on a plane orthogonal to the generating line thereof. In the description stated here, the phrase "having no refraction feature on a plane including the generating line of the curved surface" means that, when the light path of light passing through the curved surface is projected onto a plane including the generating line of the curved surface, the projected light path is viewed as not being refracted. Also, the phrase "having a refraction feature on a plane including the generating line of the curved surface" means that, when the light path of light passing through the curved surface is projected onto a plane orthogonal to the generating line of the curved surface, the projected light path is viewed as being refracted.

Figure 8A:
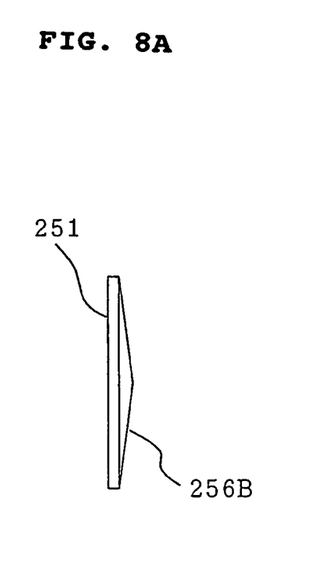
FIG. 8A illustrates the structure formed by a polarizing plate and an optical element for compensating chromatic aberration of magnification when a convex lens for compensating chromatic aberration of magnification shown in FIG. 2 is replaced with a prism.
Figure 8B:
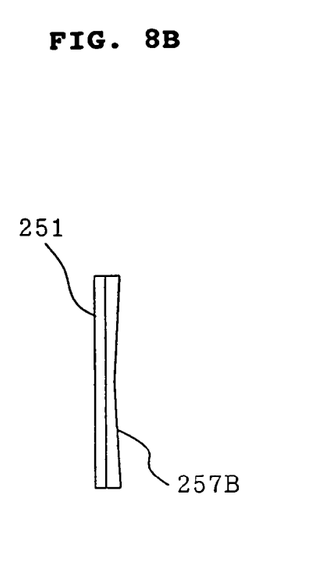
FIG. 8B illustrates the structure formed by a polarizing plate and an optical element for compensating chromatic aberration of magnification when a concave lens for compensating chromatic aberration of magnification shown in FIG. 4 is replaced with a prism.

In addition, although the convex or concave surface of the emitting surface of the polarizing plate 251 is formed so as to have a curved lens shape in the previous description, since the lens shape often has a large radius of curvature and is very thin, the emitting surface may have a prism shape by approximating the curved surface with flat planes. FIGS. 8A and 8B illustrate the above-mentioned structure, wherein FIG. 8a illustrates the lens shape formed so as to provide a prism-shaped convex surface (prismatic convex surface) 256B having a ridge line extending parallel to the Y axis to approximate the emitting surface of the polarizing plate 251 with flat planes, and FIG. 8B illustrates the lens shape formed so as to provide a prism-shaped concave surface (prismatic concave surface) 257B having a ridge line extending parallel to the Y axis to approximate the emitting surface of the polarizing plate 251 with flat planes. Even with one of these structure, the sizes of the image screens IR, IG, and IB of the corresponding kinds of color light in the X axis direction of the image screens can be arranged so as to be nearly equal to one another. That is, of differences in sizes of the projected image screens of the corresponding kinds of color light, caused by the chromatic aberration of magnification of the projection lens 270, differences in sizes of the projected image screens extending along a direction perpendicular to the generating line (the X axis direction) can be reduced.

In the meantime, a lens element or a prism element is formed on (or added to) the polarizing plate 251 disposed on the light path of the red light among the three kinds of red, green and blue-green color light in the foregoing description. However, if the processing similar to that applied on the polarizing plate 251 is also applicable on the polarizing plates 253 and 255 disposed on the light paths of the green light and the blue-green light, respectively, in place of or together with the polarizing plate 251, a lens element or a prism element may be formed on (or added to) the polarizing plate 253 and/or 255 so as to reduce differences in sizes of the projected image screens formed from the three kinds of red, green, and blue-green color light as a whole. Meanwhile, the shape of the lens element or the prism element can be decided according to the already described contents, depending on how the sizes of the projected image screens are compensated.

Figure 9:
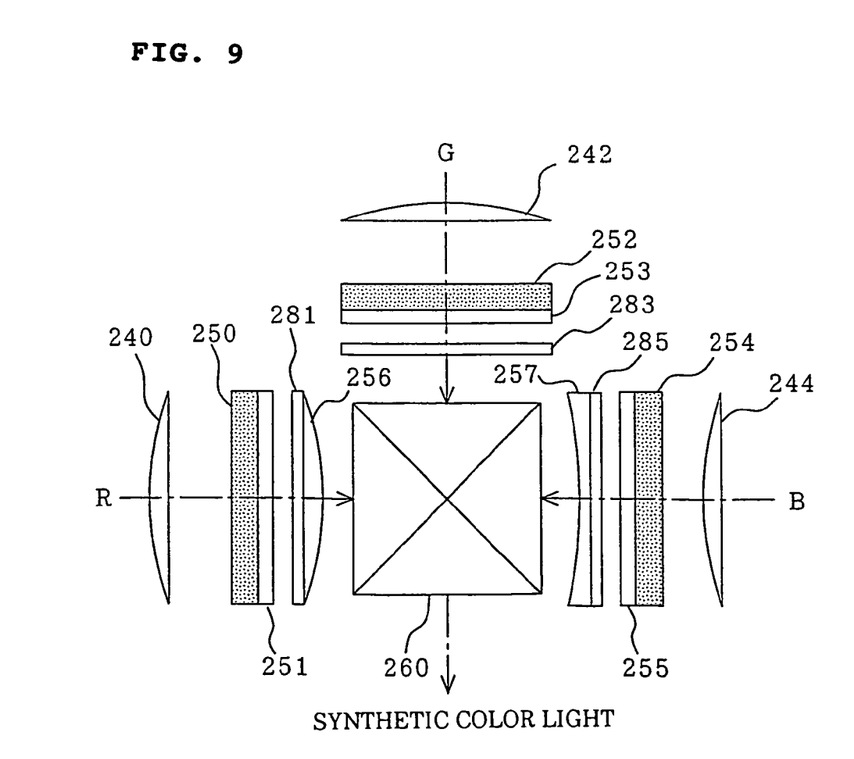
FIG. 9 is a plan view illustrating another partial structure of the optical system shown in FIG. 1, in the vicinity of the cross-dichroic prism of the same.

Also, although some of projectors have a structure in which angle-of-view compensating films are interposed between the corresponding liquid crystal panels 250, 252 and 254 and the cross-dichroic prism 260 so as to improve contrast of the corresponding projected image screens, in such a case, a lens element or a prism element similar to that added to the above mentioned polarizing plate may be formed on the emitting side of each of the angle-of-view compensating films, in place of the above-mentioned polarizing plate. In the case of the angle-of-view compensating film, since absorption of light is not needed to be taken into consideration so much, glass or a light-transmissive resin can be used as the parent material of the film regardless of a kind of color light. Accordingly, by using glass or a light-transmissive resin, the angle-of-view compensating film disposed on the light path of any kind of color light, of which the size of the projected image screen is needed to be adjusted, can be processed. FIG. 9 illustrates an example of such a structure in which angle-of-view compensating films 281, 283 and 285 are interposed between the corresponding liquid crystal panels 250, 252 and 254 and the cross-dichroic prism 260, the angle-of-view compensating film 281 disposed on the light path of the red light has the convex lens 256 formed on the emitting surface thereof, and the angle-of-view compensating film 285 disposed on the light path of blue light has the concave lens 257 formed on the emitting surface thereof. When the sizes of the image screens lie, for example, in the following order: the image screen IR of the red light<the image screen IG of the green light<the image screen IG of the blue light, the above-mentioned structure can be used so as to perform expanding compensation for making the size of the image screen IR of the red light closer to the image screen IG of the green light and to perform contracting compensation for making the size of the image screen IB of the blue light closer to the image screen IG of the green light, whereby the sizes of the image screens of the corresponding kinds of color light can be nearly equal to one another as a whole.

In addition, some of projectors have a structure in which its projection lens 270 can be shifted (moved) in parallel to two directions (the X axis direction and the Y axis direction) mutually perpendicular to the system optical axis Ax. In such a case, it is preferable that each of the optical elements 256, 256A, 256B, 257 and 257B for compensating chromatic aberration of magnification integrally formed with the previously described polarizing plate or angle-of-view compensating film be shifted (moved) in parallel to a predetermined direction, following the shift of the projection lens 270, so that chromatic aberration of magnification of the projected image screen be properly compensated.

Figure 10:
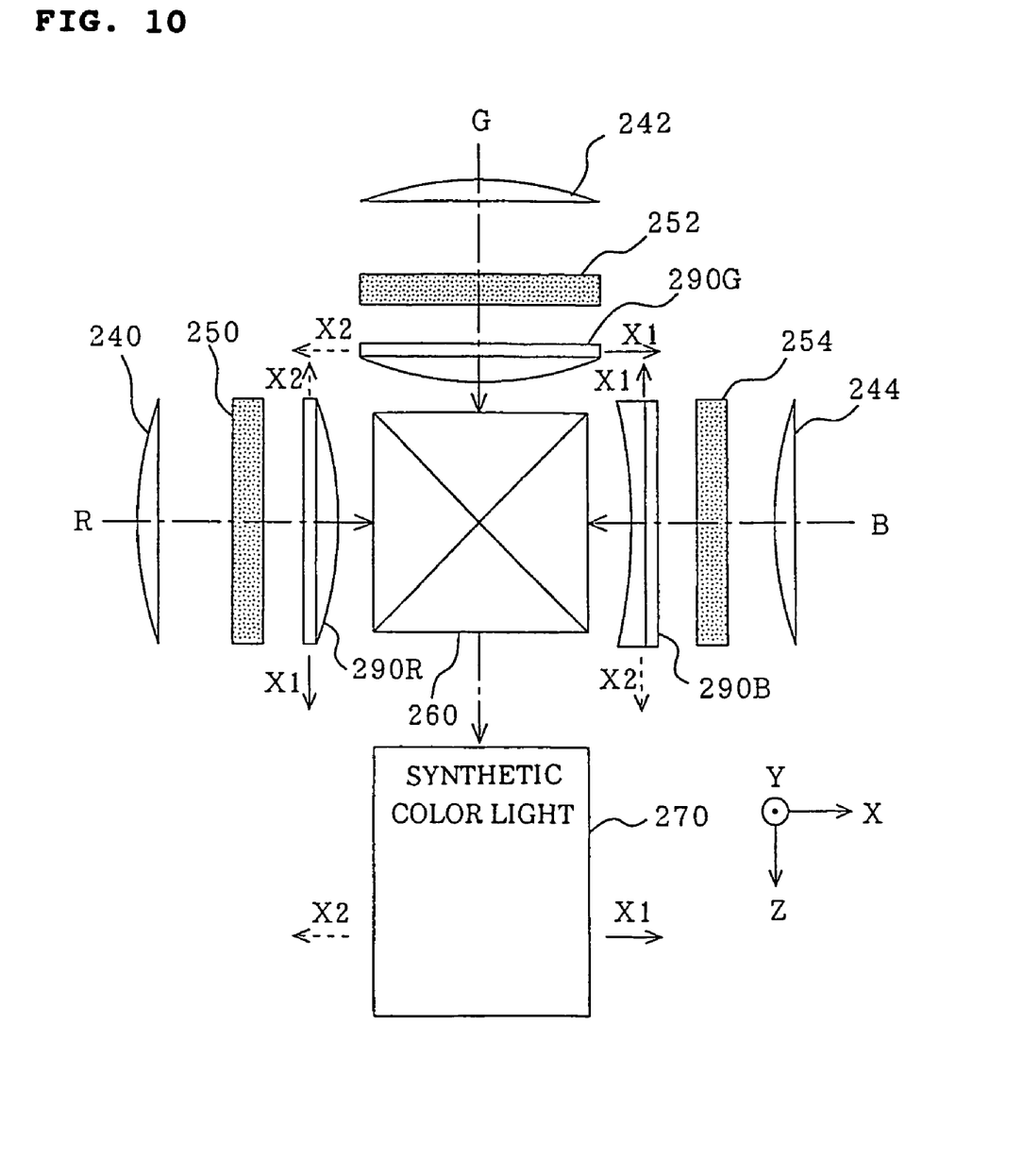
FIG. 10 is a plan view of the optical system, illustrating directions of parallel shifts of the optical axes of optical elements for compensating chromatic aberration of magnification in accordance with a shift of the projection lens in the X-axis direction.
Figure 11:
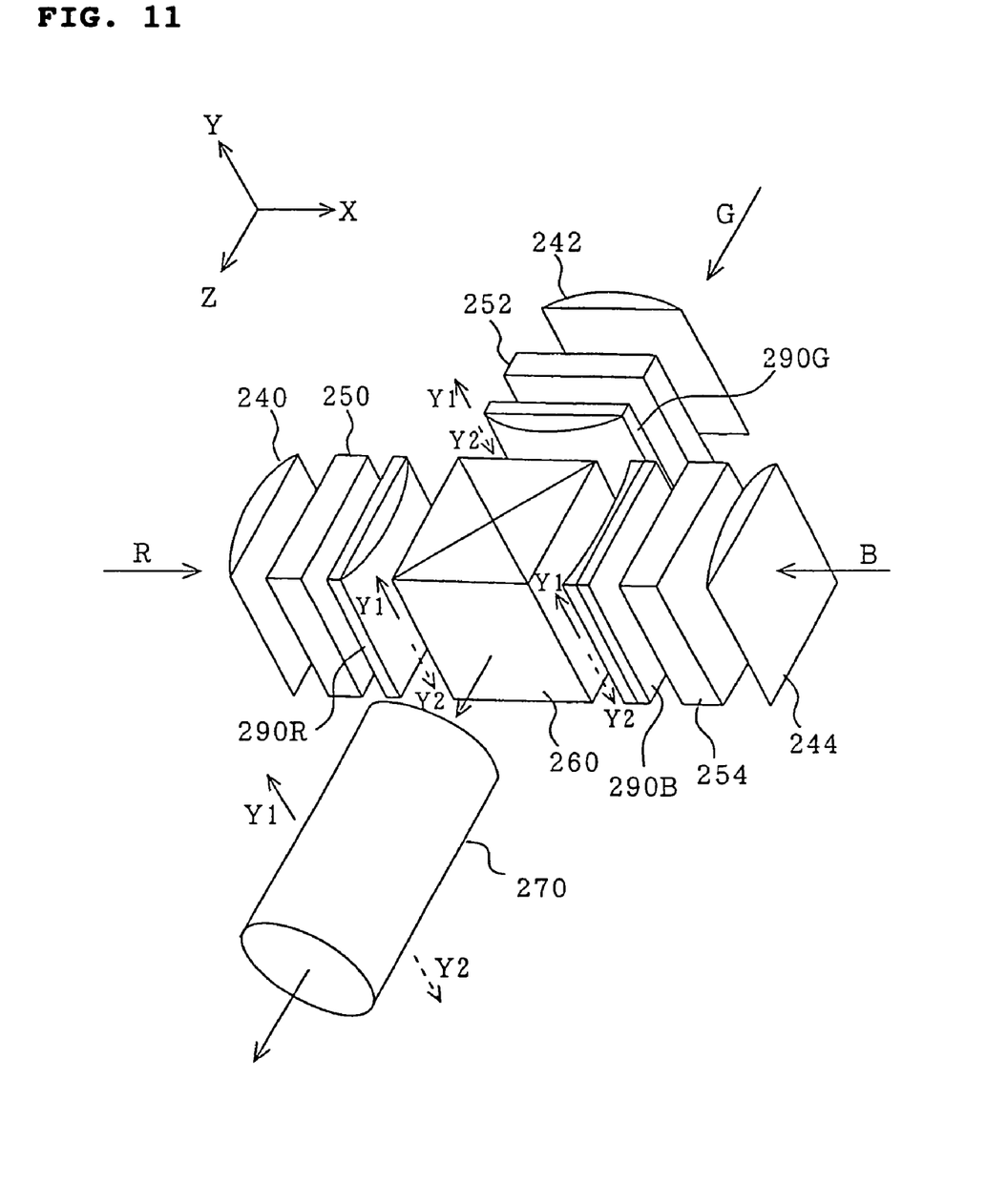
FIG. 11 is a perspective view of the optical system, illustrating directions of parallel shifts of the optical axes of the optical elements for compensating chromatic aberration of magnification in accordance with a shift of the projection lens in the Y-axis direction.

FIG. 10 is a plan view of the optical system, illustrating directions of parallel shifts of the optical axes of the optical elements for compensating chromatic aberration of magnification in accordance with a parallel shift of the optical axis of the projection lens 270 in the X axis direction, and FIG. 11 is a perspective view of the optical system, illustrating directions of parallel shifts of the optical axes of the optical elements for compensating chromatic aberration of magnification in accordance with a parallel shift of the optical axis of the projection lens 270 in the Y axis direction. Meanwhile, in the following description, the combined optical elements of the previously described polarizing plates and corresponding optical elements for compensating chromatic aberration of magnification are respectively represented by reference numbers 290R, 290G, and 290B.

When the optical axis of the projection lens 270 is shifted in the direction of the X axis with respect to the system optical axis AX, a direction of a parallel shift of the optical axis of the combined optical element 290G compensating color light passing the two kinds of dielectric multilayer films is the same as that of the parallel shift of the optical axis of the projection lens 270. Also, a direction of the parallel shift of the optical axis of each of the combined optical elements 290R and 290B compensating color light reflected at either one of the two kinds of dielectric multilayer films is opposite to that of the parallel shift of the optical axis of the projection lens 270. FIG. 10 illustrates the above-mentioned situations. In the figure, the parallel shift of the optical axis of the projection lens 270 in a positive or negative direction of the X axis is respectively shown by the solid-line arrow X1 or the broken-line arrow X2, and a direction of the parallel shift of the optical axis of each of the combined optical elements 290R, 290G and 290B corresponding to the above parallel shift is shown by the same solid-line arrow X1 or broken-line arrow X2.

When the optical axis of the projection lens 270 is shifted in parallel to the direction of the Y axis with respect to the system optical axis, the optical axis of any of the combined optical elements 290R, 290G and 290B is shifted in parallel in the same direction as the moving direction of the optical axis of the projection lens 270. FIG. 11 illustrates the above-mentioned situation. In the figure, the parallel shift of the optical axis of the projection lens 270 in a positive or negative direction of the Y axis is respectively shown by the solid-line arrow Y1 or the broken-line arrow Y2, and a direction of the parallel shift of the optical axis of each of the combined optical elements 290R, 290G and 290B corresponding to the above parallel shift is shown by the same solid-line arrow Y1 or broken-line arrow Y2.

Meanwhile, it is preferable that a shift amount of the optical axis of each of the combined optical elements 290R, 290G and 290B in these cases be the same as that of the optical axis of the projection lens 270. However, sometimes the combined optical elements 290R, 290G and 290B cannot be shifted to such an extent that the projection lens 270 is shifted, depending on a space where these optical elements are disposed. In such a case, these optical elements are preferably shifted by less than but as close as possible to the shift amount of the optical axis of the projection lens 270.

Although the present invention has been described above in detail, the present invention is not limited to the above-described embodiments and can be embodied in a variety of modes without departing from the spirit of the present invention. For example, the following modification is possible.

In order to form a lens element or a prism element on and integrally with one surface of the polarizing plate or the angle-of-view compensating film, the lens or the prism may be bonded on the incident surface or the emitting surface thereof, or a thin resin film which is cured by irradiation with light such as ultraviolet ray or by heat may be attached on the incident surface thereof. Also, the convex surface of the convex lens for compensating chromatic aberration of magnification and the concave surface of the concave lens for compensating chromatic aberration of magnification are not limited to being spherical and may be aspheric.

In addition, although the electrooptical device of the projector is a transmissive liquid crystal panel in the above-described embodiments, the electrooptical device is not limited to the above-mentioned panel. For example, a micromirror device performing optical modulation by controlling reflecting light in accordance with an angle of a micromirror may be used. In other words, a variety of devices which modulate light in accordance with an image signal so as to form an image are applicable to the electrooptical device.

INDUSTRIAL APPLICABILITY

The present invention is applicable to a projection TV and a projector used for screening a film, presentation, or the like.

REFERENCE NUMERALS

100: illumination optical system
214: color-light-separating optical system
240, 242, 244: field lenses
250, 252, 254: liquid crystal panels
251, 253, 255: polarizing plates
256: lens for compensating chromatic aberration of magnification
257: concave lens for compensating chromatic aberration of magnification
256A: cylindrical convex surface for compensating chromatic aberration of magnification
256B: prism-shaped convex surface for compensating chromatic aberration of magnification
257B: prism-shaped concave surface for compensating chromatic aberration of magnification
260: cross-dichroic prism
270: projection lens
281, 283, 285: angle-of-view compensating films
290R, 290G, 290B: combined optical elements
300: projection screen
AX: system optical axis

The invention claimed is:

1. A projector comprising:
an illumination optical system emitting illumination light; a color-light-separating optical system separating the illumination light into three kinds of red, green, and blue light; electrooptical devices receiving the three kinds of color light separated by the color-light-separating optical system, converting them into corresponding kinds of light for forming images of the corresponding kinds of color light in accordance with image signals of the corresponding kinds of color light, and emitting them; a color-light-synthesizing optical system synthesizing the three kinds of color light emitted from the electrooptical devices; a projection optical system projecting the light synthesized by the color-light-synthesizing optical system; and polarizing plates disposed on the light paths of the corresponding kinds of color light between the corresponding electrooptical devices and the color-light-synthesizing optical system, and
the projector further comprising an optical element which adjusts the size of a projected image screen of at least one of the three kinds of color light extending along at least a predetermined direction so as to be nearly equal to those of the other kinds of color light extending along the predetermined direction and which is formed on and integrally with one surface of the corresponding polarizing plate so as to serve as an optical element for compensating chromatic aberration of magnification,
wherein the parent material of the polarizing plate disposed on the light path of the red light is composed of glass or a light-transmissive resin, the parent materials of the polarizing plates disposed on the light paths of the green and blue light are composed of sapphire or quartz crystal, and the optical element for compensating chromatic aberration of magnification is disposed only on the light path of the red light.

2. The projector according to claim 1, wherein the optical element is a lens element or a prism element.

3. The projector according to claim 1, wherein, when the optical axis of the projection optical system is shifted in parallel to at least one of two directions mutually perpendicular to the system optical axis, the optical axis of the optical element for compensating chromatic aberration of magnification is shifted in parallel to the foregoing direction, following the shift of the optical axis of the projection optical system.

4. The projector according to claim 3, wherein an amount of the parallel shift of the optical axis of the optical element for compensating chromatic aberration of magnification is the same as that of the parallel shift of the optical axis of the projection optical system.

5. The projector according to claim 3, wherein an amount of the parallel shift of the optical axis of the optical element for compensating chromatic aberration of magnification is smaller than that of the parallel shift of the optical axis of the projection optical system.

6. The projector according to claim 3, wherein the color-light-synthesizing optical system is a cross-dichroic prism having two kinds of dielectric multilayer films formed along the interfaces of four rectangular prisms in an approximate X-shape.

7. The projector according to claim 6, wherein, when the optical axis of the projection optical system is shifted in parallel to an axial direction parallel to the line of intersection between the two kinds of dielectric multilayer films, a direction of the parallel shift of the optical axis of the optical element for compensating chromatic aberration of magnification is the same as that of the parallel shift of the optical axis of the projection optical system.

8. The projector according to claim 6, wherein, when the optical axis of the projection optical system is shifted in parallel to an axial direction perpendicular to the line of intersection between the two kinds of dielectric multilayer films and to the system optical axis, a direction of the parallel shift of the optical axis of the optical element for compensating chromatic aberration of magnification, compensating color light passing through the two kinds of dielectric multilayer films, is the same as that of the parallel shift of the optical axis of the projection optical system, and a direction of the parallel shift of the optical axis of the optical element for compensating chromatic aberration of magnification, compensating color light reflected at any one of the two kinds of dielectric multilayer films, is opposite to that of the parallel shift of the optical axis of the projection optical system.

9. The projector according to claim 1, wherein the optical element has no refraction feature on a plane extending orthogonal to the predetermined direction and including the generating line thereof and has a refraction feature on a plane extending orthogonal to the generating line thereof.

10. A projector comprising: an illumination optical system emitting illumination light; a color-light-separating optical system separating the illumination light into three kinds of red, green, and blue light; electrooptical devices receiving the three kinds of color light separated by the color-light-separating optical system, converting them into corresponding kinds of light for forming images of the corresponding kinds of color light in accordance with image signals of the corresponding kinds of color light, and emitting them; a color-light-synthesizing optical system synthesizing the three kinds of color light emitted from the electrooptical devices; a projection optical system projecting the light synthesized by the color-light-synthesizing optical system; and angle-of-view compensating films disposed on the light paths of the corresponding kinds of color light between the corresponding electrooptical devices and the color-light-synthesizing optical system, and the projector further comprising an optical element which adjusts the size of a projected image screen of at least one of the three kinds of color light, extending along at least a predetermined direction, so as to be nearly equal to those of the other kinds of color light extending along the predetermined direction and which is formed on and integrally with one surface of the corresponding angle-of-view compensating film so as to serve as an optical element for compensating chromatic aberration of magnification, and wherein, when the optical axis of the projection optical system is shifted in parallel to at least one of two directions mutually perpendicular to the system optical axis, the optical axis of the optical element for compensating chromatic aberration of magnification is shifted in parallel to the foregoing direction, following the shift of the optical axis of the projection optical system.

11. The projector according to claim 10, wherein an amount of the parallel shift of the optical axis of the optical element for compensating chromatic aberration of magnification is the same as that of the parallel shift of the optical axis of the projection optical system.

12. The projector according to claim 10, wherein an amount of the parallel shift of the optical axis of the optical element for compensating chromatic aberration of magnification is smaller than that of the parallel shift of the optical axis of the projection optical system.

13. The projector according to claim 10, wherein the color-light-synthesizing optical system is a cross-dichroic prism having two kinds of dielectric multilayer films formed along the interfaces of four rectangular prisms in an approximate X-shape.

14. The projector according to claim 13, wherein, when the optical axis of the projection optical system is shifted in parallel to an axial direction parallel to the line of intersection between the two kinds of dielectric multilayer films, a direction of the parallel shift of the optical axis of the optical element for compensating chromatic aberration of magnification is the same as that of the parallel shift of the optical axis of the projection optical system.

15. The projector according to claim 13, wherein, when the optical axis of the projection optical system is shifted in parallel to an axial direction perpendicular to the line of intersection between the two kinds of dielectric multilayer films and to the system optical axis, a direction of the parallel shift of the optical axis of the optical element for compensating chromatic aberration of magnification, compensating color light passing through the two kinds of dielectric multilayer films, is the same as that of the parallel shift of the optical axis of the projection optical system, and a direction of the parallel shift of the optical axis of the optical element for compensating chromatic aberration of magnification, compensating color light reflected at any one of the two kinds of dielectric multilayer films, is opposite to that of the parallel shift of the optical axis of the projection optical system.

16. A projector comprising:
    an illumination optical system emitting illumination light; a color-light-separating optical system separating the illumination light into three kinds of red, green, and blue light; electrooptical devices receiving the three kinds of color light separated by the color-light-separating optical system, converting them into corresponding kinds of light for forming images of the corresponding kinds of color light in accordance with image signals of the corresponding kinds of color light, and emitting them; a color-light-synthesizing optical system synthesizing the three kinds of color light emitted from the electrooptical devices; a projection optical system projecting the light synthesized by the color-light-synthesizing optical system; and polarizing plates disposed on the light paths of the corresponding kinds of color light between the corresponding electrooptical devices and the color-light-synthesizing optical system, and
    the projector further comprising an optical element which adjusts the size of a projected image screen of at least one of the three kinds of color light extending along at least a predetermined direction so as to be nearly equal to those of the other kinds of color light extending along the predetermined direction and which is formed on and integrally with one surface of the corresponding polarizing plate so as to serve as an optical element for compensating chromatic aberration of magnification,
    wherein, when the optical axis of the projection optical system is shifted in parallel to at least one of two directions mutually perpendicular to the system optical axis, the optical axis of the optical element for compensating chromatic aberration of magnification is shifted in parallel to the foregoing direction, following the shift of the optical axis of the projection optical system.

17. The projector according to claim 16, wherein an amount of the parallel shift of the optical axis of the optical element for compensating chromatic aberration of magnification is the same as that of the parallel shift of the optical axis of the projection optical system.

18. The projector according to claim 16, wherein an amount of the parallel shift of the optical axis of the optical element for compensating chromatic aberration of magnification is smaller than that of the parallel shift of the optical axis of the projection optical system.

19. The projector according to claim 16, wherein the color-light-synthesizing optical system is a cross-dichroic prism having two kinds of dielectric multilayer films formed along the interfaces of four rectangular prisms in an approximate X-shape.

20. The projector according to claim 19, wherein, when the optical axis of the projection optical system is shifted in parallel to an axial direction parallel to the line of intersection between the two kinds of dielectric multilayer films, a direction of the parallel shift of the optical axis of the optical element for compensating chromatic aberration of magnification is the same as that of the parallel shift of the optical axis of the projection optical system.

21. The projector according to claim 19, wherein, when the optical axis of the projection optical system is shifted in parallel to an axial direction perpendicular to the line of intersection between the two kinds of dielectric multilayer films and to the system optical axis, a direction of the parallel shift of the optical axis of the optical element for compensating chromatic aberration of magnification, compensating color light passing through the two kinds of dielectric multilayer films, is the same as that of the parallel shift of the optical axis of the projection optical system, and a direction of the parallel shift of the optical axis of the optical element for compensating chromatic aberration of magnification, compensating color light reflected at any one of the two kinds of dielectric multilayer films, is opposite to that of the parallel shift of the optical axis of the projection optical system.

22. The projector according to claim 16, wherein the optical element has no refraction feature on a plane extending orthogonal to the predetermined direction and including the generating line thereof and has a refraction feature on a plane extending orthogonal to the generating line thereof.

23. A projector comprising:
an illumination optical system emitting illumination light; a color-light-separating optical system separating the illumination light into three kinds of red, green, and blue light; electrooptical devices receiving the three kinds of color light separated by the color-light-separating optical system, converting them into corresponding kinds of light for forming images of the corresponding kinds of color light in accordance with image signals of the corresponding kinds of color light, and emitting them; a color-light-synthesizing optical system synthesizing the three kinds of color light emitted from the electrooptical devices; a projection optical system projecting the light synthesized by the color-light-synthesizing optical system; and polarizing plates disposed on the light paths of the corresponding kinds of color light between the corresponding electrooptical devices and the color-light-synthesizing optical system, and the projector further comprising an optical element which adjusts the size of a projected image screen of at least one of the three kinds of color light extending along at least a predetermined direction so as to be nearly equal to those of the other kinds of color light extending along the predetermined direction and which is formed on and integrally with one surface of the corresponding polarizing plate so as to serve as an optical element for compensating chromatic aberration of magnification, wherein the optical element has no refraction feature on a plane extending orthogonal to the predetermined direction and including the generating line thereof and has a refraction feature on a plane extending orthogonal to the generating line thereof.

24. The projector according to claim 23, wherein the optical element has no refraction feature on a plane extending orthogonal to the predetermined direction and including the generating line thereof and has a refraction feature on a plane extending orthogonal to the generating line thereof.

25. A projector comprising:
an illumination optical system emitting illumination light; a color-light-separating optical system separating the illumination light into three kinds of red, green, and blue light; electrooptical devices receiving the three kinds of color light separated by the color-light-separating optical system, converting them into corresponding kinds of light for forming images of the corresponding kinds of color light in accordance with image signals of the corresponding kinds of color light, and emitting them; a color-light-synthesizing optical system synthesizing the three kinds of color light emitted from the electrooptical devices; a projection optical system projecting the light synthesized by the color-light-synthesizing optical system; and angle-of-view compensating films disposed on the light paths of the corresponding kinds of color light between the corresponding electrooptical devices and the color-light-synthesizing optical system, and the projector further comprising an optical element which adjusts the size of a projected image screen of at least one of the three kinds of color light, extending along at least a predetermined direction, so as to be nearly equal to those of the other kinds of color light extending along the predetermined direction and which is formed on and integrally with one surface of the corresponding angle-of-view compensating film so as to serve as an optical element for compensating chromatic aberration of magnification, wherein the optical element has no refraction feature on a plane extending orthogonal to the predetermined direction and including the generating line thereof and has a refraction feature on a plane extending orthogonal to the generating line thereof.

* * * * *